(12) United States Patent
Frey et al.

(10) Patent No.: US 9,696,012 B2
(45) Date of Patent: Jul. 4, 2017

(54) EMBEDDED LED ASSEMBLY WITH OPTIONAL BEAM STEERING OPTICAL ELEMENT, AND ASSOCIATED PRODUCTS, AND/OR METHODS

(71) Applicant: Guardian Industries Corp., Auburn Hills, MI (US)

(72) Inventors: Timothy J. Frey, Syracuse, IN (US); Robert A. Vandal, Syracuse, IN (US); Vijayen S. Veerasamy, Ann Arbor, MI (US); Jean-Marc Sol, Thionville (FR)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 13/644,567

(22) Filed: Oct. 4, 2012

(65) Prior Publication Data
US 2014/0098553 A1     Apr. 10, 2014

(51) Int. Cl.
*B32B 37/14* (2006.01)
*F21V 11/00* (2015.01)
(Continued)

(52) U.S. Cl.
CPC ........ *F21V 11/00* (2013.01); *B32B 17/10036* (2013.01); *B32B 17/10541* (2013.01);
(Continued)

(58) Field of Classification Search
CPC . B60Q 1/24; B60Q 1/34; B60Q 1/245; B60Q 1/268; B60Q 1/302; F21V 5/04;
(Continued)

(56) References Cited

U.S. PATENT DOCUMENTS

| | | | | |
|---|---|---|---|---|
| 4,722,023 | A | * | 1/1988 | Arima et al. ................. 362/503 |
| 5,066,112 | A | * | 11/1991 | Lynam et al. ................ 359/267 |

(Continued)

FOREIGN PATENT DOCUMENTS

| | | |
|---|---|---|
| CN | 102007616 A | 4/2011 |
| DE | 195 07 234 | 9/1996 |

(Continued)

OTHER PUBLICATIONS

International Search Report mailed Jan. 2, 2014.
(Continued)

*Primary Examiner* — Anh Mai
*Assistant Examiner* — Arman B Fallahkhair
(74) *Attorney, Agent, or Firm* — Nixon & Vanderhye P.C.

(57) ABSTRACT

Certain example embodiments of this invention relate to laminated LED arrays, products including such laminated LED arrays, and/or methods of making the same. In certain example embodiments, LEDs may be disposed on a flexible sheet and chained together in an array. An optional beam steering optical element may be used to help redirect the light, even when the LED arrays are disposed on a curved surface and/or at an angle that is not parallel to the intended observer's line of sight. Doing so advantageously makes it possible to ensure that a substantial portion of the axis of the light produced by embedded LEDs coincides with the front-to-rear axis of a vehicle, while still allowing for different angles of the back light for different implementations. Such techniques advantageously may be used in connection with Center High Mount Stop Lamps (CHMSLs); tail lights for cars, trucks, and other vehicles; and/or the like.

6 Claims, 3 Drawing Sheets

(51) Int. Cl.
  *B32B 17/10* (2006.01)
  *B60Q 1/30* (2006.01)
  *F21S 8/10* (2006.01)
  *B60Q 1/26* (2006.01)

(52) U.S. Cl.
  CPC ........ *B32B 17/10761* (2013.01); *B32B 37/14* (2013.01); *B60Q 1/268* (2013.01); *B60Q 1/2696* (2013.01); *B60Q 1/302* (2013.01); *F21S 48/211* (2013.01); *F21S 48/215* (2013.01); *F21S 48/2212* (2013.01)

(58) Field of Classification Search
  CPC ..... F21V 7/04; F21V 7/09; F21S 4/001; F21S 48/088; F21S 48/215; F21S 48/1233; F21S 48/225; F21S 48/2243; F21K 9/00; F21Y 2101/02; B60R 1/088; B82Y 20/00; G02B 26/0841; G02B 6/0033; G02B 6/0035; G02B 6/0036; G02B 6/0038; G02B 6/0041; G02B 6/0076; G02B 6/0053; B32B 37/14; B32B 17/10761; G02F 1/157
  USPC ..... 362/297, 249.02, 249.06, 503, 504, 543, 362/545, 237, 240, 318, 627, 241, 244, 362/511, 328, 606, 607, 612, 235, 626, 362/84, 330, 333, 334
  See application file for complete search history.

(56) References Cited

U.S. PATENT DOCUMENTS

| | | | |
|---|---|---|---|
| 5,241,457 A | 8/1993 | Sasajima et al. | |
| 5,488,493 A * | 1/1996 | Moss | 359/13 |
| 5,816,681 A * | 10/1998 | Tedesco | 362/459 |
| 6,383,571 B1 | 5/2002 | Mühlfriedel | |
| 6,910,779 B2 * | 6/2005 | Abel et al. | 359/839 |
| 7,400,439 B2 * | 7/2008 | Holman | 359/298 |
| 7,656,585 B1 | 2/2010 | Powell et al. | 359/630 |
| 7,794,125 B2 * | 9/2010 | Offermann et al. | 362/490 |
| 7,817,327 B2 * | 10/2010 | Derda | 359/275 |
| 7,920,245 B2 * | 4/2011 | Miura et al. | 349/183 |
| 8,044,415 B2 * | 10/2011 | Messere et al. | 257/88 |
| 8,093,789 B2 * | 1/2012 | Van Herpen et al. | 313/46 |
| 8,192,051 B2 * | 6/2012 | Dau et al. | 362/249.02 |
| 8,519,362 B2 * | 8/2013 | Labrot et al. | 250/461.2 |
| 8,545,030 B2 * | 10/2013 | Anderson et al. | 359/604 |
| 2004/0008106 A1 | 1/2004 | Konczal | |
| 2005/0238857 A1 | 10/2005 | Day | |
| 2006/0015013 A1 | 1/2006 | Gilard et al. | |
| 2006/0275599 A1 | 12/2006 | Lefevre | |
| 2007/0153543 A1 | 7/2007 | Xu et al. | |
| 2008/0079012 A1 * | 4/2008 | Grote et al. | 257/89 |
| 2008/0080163 A1 * | 4/2008 | Grote, III et al. | 362/23 |
| 2008/0080181 A1 | 4/2008 | Yu et al. | |
| 2008/0205077 A1 | 8/2008 | Lenderink et al. | |
| 2009/0015736 A1 | 1/2009 | Weller et al. | |
| 2009/0051277 A1 | 2/2009 | Inoue et al. | |
| 2009/0103298 A1 | 4/2009 | Boonekamp et al. | |
| 2009/0175047 A1 | 7/2009 | Tsai | |
| 2010/0060821 A1 | 3/2010 | Wang et al. | |
| 2011/0171764 A1 | 7/2011 | Toonen et al. | |
| 2012/0088319 A1 | 4/2012 | Veerasamy et al. | |
| 2014/0098557 A1 * | 4/2014 | Veerasamy | 362/545 |
| 2014/0254187 A1 * | 9/2014 | Massault et al. | 362/511 |

FOREIGN PATENT DOCUMENTS

| | | |
|---|---|---|
| EP | 0 495 685 | 7/1992 |
| WO | WO 2004/009349 | 1/2004 |
| WO | WO 2007/085599 | 8/2007 |
| WO | WO 2008/007297 | 1/2008 |
| WO | WO 2009/102201 | 8/2009 |
| WO | WO 2012/047254 | 4/2012 |
| WO | WO 2012/047255 | 4/2012 |
| WO | WO 2012/047263 | 4/2012 |
| WO | WO 2012/047288 | 4/2012 |

OTHER PUBLICATIONS

U.S. Appl. No. 13/644,458, filed Oct. 4, 2012; Veerasamy.
U.S. Appl. No. 13/644,396, filed Oct. 4, 2012; Veerasamy.
U.S. Appl. No. 13/188,916, filed Jul. 22, 2011; Veerasamy et al.
U.S. Appl. No. 13/488,779, filed Jun. 5, 2012; Veerasamy.
Spectrum Scientific Diffraction Grating Definitions [retrieved Jul. 31, 2012]. http://www.ssioptics.com/definitions.html.
Keyence America. Fiber Laser Technology: MD-F3000 Series 3-Axis Fiber Laser Marker [retrieved Oct. 3, 2012]. http://www.keyence.com/products/marker/lasermarker/mdf3000/mdf3000_features_1.php.

* cited by examiner

EMBEDDED LED ASSEMBLY WITH OPTIONAL BEAM STEERING OPTICAL ELEMENT, AND ASSOCIATED PRODUCTS, AND/OR METHODS

FIELD OF THE INVENTION

Certain example embodiments of this invention relate to light emitting diode (LED) systems, and/or methods of making the same. More particularly, certain example embodiments of this invention relate to laminated LED arrays, products including such laminated LED arrays, and/or methods of making the same. An optional beam steering optical element may be used to help redirect the light, even when the LED arrays are disposed on a curved surface and/or at an angle that is not parallel to the intended observer's line of sight.

BACKGROUND AND SUMMARY OF EXAMPLE EMBODIMENTS OF THE INVENTION

A large proportion (some estimates are as high as 25%) of the electricity generated in the United States each year goes to lighting. Accordingly, there is an ongoing need to provide lighting that is more energy-efficient. It is well-known that incandescent light bulbs are very energy-inefficient light sources. About 90% of the electricity they consume is released as heat rather than light. Fluorescent light bulbs are more efficient than incandescent light bulbs (e.g., by a factor of about 10) but are still less efficient as compared to solid state light emitters, such as light emitting diodes (LEDs).

It will be appreciated that embedding LEDs and associated electrical circuitry for selectively turning such embedded LEDs on and off within the structure of a laminated pair of curved or non-curved glass plates, and using the same as a part of the safe visible viewing scheme for drivers and their passengers, would offer many potential advantages for motor vehicle manufacturers. For example, such techniques could provide increased interior space compared to, for example, alternative lights that are exterior to the glass but attached to the glass. Such assemblies also could have a lower overall weight, e.g., as the housing for a light that is external to the glass but attached to the glass or separately mounted as an assembly to the body, could be eliminated. The reduction of the components, and the ability to use lower cost components, could reduce manufacturing/assembly related costs. LEDs also sometimes offer improved reliability for the overall light assembly compared to, for example, an incandescent light bulb inclusive assembly external to the glass but attached to the glass (e.g., given the delicacy of the lamp filament compared to the solid state LED).

Unfortunately, however, there are several disadvantages or difficulties in implementing such systems. One category of disadvantages/difficulties relates to the geometric linking of the glass orientation and the axis of the light emitting pattern. For example, the optical axis of the light output typically will be geometrically normal to the surface of the glass, when it instead would oftentimes be desirable for the optical axis of light output to have a different orientation. More particularly, because the surface where the LEDs will be located typically will be angled and/or curved, light may be output and/or spread in undesired directions.

An example of the potential problem with embedded LEDs is in their use as Center High Mount Stop Lamps (CHMSLs); tail lights for cars, trucks, and other vehicles; etc. Those lamps typically are in housings that oftentimes are plastic and attached to the interior surface of the backlite of a vehicle, or affixed otherwise to the body. Federal regulations in the United States stipulate the intensity, color, physical size, orientation, and operation of the lamps. More particularly, the light output optical axis should be oriented largely in the direction of the driver of a vehicle behind the stated vehicle. If the back light is oriented at right angles to the front-to-back axis of the vehicle, then the CHMSL light axis will be substantially in alignment with the axis of the vehicle and, thus, the lights will shine back on the driver of the trailing vehicle. However, if the backlite is declined at an angle, then the lights will shine "up" relative to the direction of the driver in the trailing car. In fact, there are as many angles of declination, as there are models of vehicles.

Figure 1:
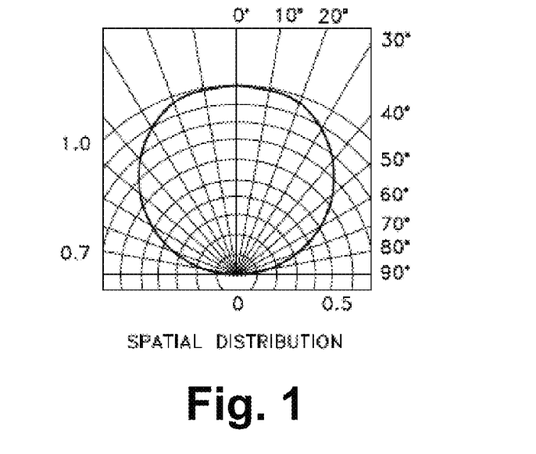
FIG. 1 plots the spatial distribution of a typical lensless LED and thus shows the output of a typical LED such as might be used in a typical Center High Mount Stop Lamp (CHMSL) type application.

FIG. 1, which plots the spatial distribution of a typical lensless LED, shows the output of a typical LED such as might be used in a typical CHMSL. The figure shows the light output in relative percent as a function of angle away from its local normal. This pattern is generally symmetric and can be represented as a "cosine" distribution, for example. It can be seen that, in this example, for small deviations from the "0" angle (which corresponds to normal to the LED surface), the light output percent relative to the 0 angle is only a few percent less than along the normal. That is, the light is nearly as bright a few degrees away from the normal. Yet at an angle of, for example, 40 degrees away from normal, the light output has fallen to less than 80% of the normal output. This essentially means that if the normal output is the level of light output that is desirable in the direction of the viewer, 20% brighter LEDs should be included to compensate for this drop-off.

This increased brightness requirement may, however, impact the temperature that the embedded LEDs will rise to during operation. Higher LED temperatures are known to reduce both the LED output brightness, as well as the lifetime of the LEDs. And even if the brightness of the LEDs could be increased to compensate for the loss in brightness off-axis, the on-axis brightness might be high enough to be a distraction.

Thus, it will be appreciated that there is a need in the art for techniques for altering the axis of light output from embedded LEDs relative to the geometric surface of the glass. For example, it will be appreciated that there is a need in the art for techniques for making the axis of the light produced by embedded LEDs coincide with the front-to-rear axis of a vehicle, while still allowing for different angles of the back light of different vehicles.

One aspect of certain example embodiments relates to optically altering the axis of light output from embedded LEDs relative to the geometric surface of the glass on which they are mounted.

In certain example embodiments of this invention, a window for a vehicle is provided. First and second glass substrates are laminated to one another via a first laminating material. A sheet supports a plurality of LEDs. An optical element is interposed between the LEDs and an intended viewer of the LEDs. The optical element is structured to redirect light output from the LEDs in a direction that is substantially in alignment with a major axis of the vehicle.

According to certain example embodiments, the LEDs and the optical element are disposed between the first and second glass substrates; and/or the optical element and the LEDs are disposed between the cover substrate and the first substrate, and the optical element and the LEDs are laminated to the cover substrate and the first substrate via a second laminating material.

According to certain example embodiments, the plurality of LEDs are provided as a part of a CHMSL, the CHMSL being controllable by a controller remote from the LEDs.

In certain example embodiments of this invention, an electronic device is provided. First and second glass substrates are laminated to one another via a first laminating material. The first and second substrates have substantially matching curvatures and/or are adapted for installation at an angle that is not normal to a first intended viewer's line of sight. A sheet supports a first set of LEDs. A first holographic or ruled optical element is interposed between the first set of LEDs and the first intended viewer of the first set of LEDs. The first optical element is structured to redirect at least some light output from the first set of LEDs such that a substantial amount of light output from the first set of LEDs is focused in a first direction that is generally normal to the first intended viewer's line of sight. The first set of LEDs and the first optical element are (a) disposed between the first and second glass substrates, and/or (b) laminated between a cover glass substrate and the first substrate with a second laminating material.

According to certain example embodiments, a second set of LEDs and a second holographic or ruled optical element are provided, with the second optical element being interposed between the second set of LEDs and a second intended viewer, and with the second optical element being structured to redirect at least some light output from the second set of LEDs such that a substantial amount of light output from the second set of LEDs is focused in a second direction, different from the first direction, that is generally normal to the second intended viewer's line of sight.

Corresponding methods also are provided in certain example embodiments. For instance, in certain example embodiments of this invention, a method of making a window for a vehicle is provided. First and second glass substrates are laminated together with a first laminating material. A sheet supporting a plurality of LEDs and an optical element to be oriented between the LEDs and an intended viewer of the LEDs are provided. The optical element is structured to redirect light output from the LEDs in a direction that is substantially in alignment with a major axis of the vehicle. The LEDs and the optical element are laminated (a) between the first and second glass substrates, and/or (b) between a cover substrate and the first substrate in connection with a second laminating material.

These sorts of electronic devices may be used in sign, display, logo illumination, tail light, CHMSL, and/or other applications.

The features, aspects, advantages, and example embodiments described herein may be combined in any suitable combination or sub-combination to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments relate to techniques for optically altering the axis of light output from embedded LEDs relative to the geometric surface of the glass on which they are mounted. Such techniques advantageously may be used in connection with Center High Mount Stop Lamps (CHMSLs); tail lights for cars, trucks, and other vehicles; and/or the like. Doing so advantageously makes it possible to ensure that a substantial portion of the axis of the light produced by embedded LEDs coincides with the front-to-rear axis of a vehicle, while still allowing for different angles of the back light for different implementations.

In certain example embodiments, LEDs are substantially anchored to the rigid surface of the glass used in a windshield, backlite, or the like, during and/or subsequent to lamination. Optics may be used to modify the axis of the light output, with the optics used optionally being included within the glass laminate. More particularly, certain example embodiments may include an optical element (OE) such as a holographic optical element (HOE), a ruled optical element (ROE), or the like, situated over the LEDs such that the OE steers the light output from the LEDs in the direction of the trailing driver and at the desired angle(s).

Figure 2:
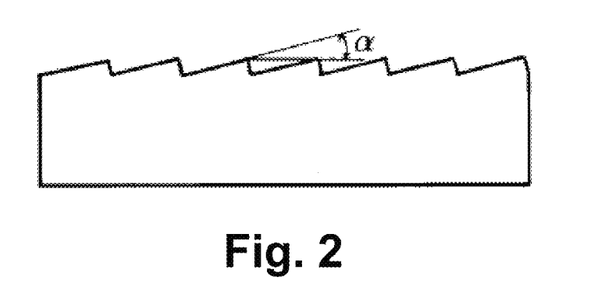
FIG. 2 is an enlarged view of a cross-section of a stamper that may be used to create an optical element in accordance with certain example embodiments.

An optical element may be created using a piece of clear plastic or other material. One side of the material is smooth, but the other side has been previously softened and pressed into a metal plate (called a "stamper") that has a series of very tiny closely spaced triangular grooves cut into it. FIG. 2 is an enlarged view of a cross-section of a stamper that may be used to create an optical element in accordance with certain example embodiments. When the material is cooled and pulled away from the stamper, a faithful replica pattern is embossed therein. When this plastic or other material is placed in the path of a light beam, the light will deflect from its incident direction at an angle $\alpha$, known as the "blaze" angle. For both HOEs and ROEs, groove density and blaze angle specify the depth of the groove and thus help control how light is steered.

Embossed "rulings" in plastic sheets are inexpensive and commercially available. See also, for example, U.S. Publication No. 2007/0153543, the entire content of which is hereby incorporated herein by reference. The '543 publication describes the use of a Light Re-Directing (LRD) element, which would have the effect of reducing the brightness of an incident beam of light in the forward direction (normal), and increasing the brightness of the beam in complementary angles away from the normal, if used in this application. While the '543 publication apparently uses its techniques to make it easier for pilots and co-pilots to see screens that are substantially in the middle of the two pilots and whose light output would essentially be in the direction of a phantom pilot directly in front of the screen and not at angles to either side of the screen, certain example embodiments of this invention may instead use the LRD to redirect light from direct/non-spatially modulated LEDs or the like.

That is, the LRDs of the '543 publication may be used to help steer a beam of a single or aggregate of non-spatially modulated, non-display front of back light-embedded LEDs in a direction substantially in line with the front-to-back axis of a vehicle.

The beam steering element may in some instances be tailored to the orientation of the backlite vis-à-vis the direction towards the trailing vehicle driver. In one example implementation, the beam steering element may be produced to steer the beam in two or more different directions, for instance, if the embedded LEDs were partially wrapped around the curve of the window. In fact, it will be appreciated that a beam steering element may be made to accommodate different angles for every LED in an aggregate of LEDs, if so desired. If some embedded LEDs in a cluster are already oriented towards the trailing driver, the beam steering element in corresponding areas need not be redirect the light (and, thus, the element may have a "null beam deflection" at these corresponding areas), whereas that same beam steering element may substantially direct the light output in the direction of the driver for other (and perhaps adjacent) LEDs that have orientations away from the trailing driver may.

It will be appreciated that the beam steering element may be structured so that the light output is made to converge essentially to a point or small area in space in certain example embodiments. The distance at which that point or small area is located may be a predetermined distance behind the vehicle, in certain example embodiments. In certain other example embodiments, an adjustable beam steering element may be manipulated to make the light converge on a small area, e.g., based on a determination of the distance to the trailing vehicle(s). Beam steering elements may be shifted into place by a small motor, the groove density and/or blaze angle may be mechanically or otherwise adjusted, etc., in order to tailor a response to a ranger finder or other distance measuring module.

Referring once again to FIG. 2, which shows an enlarged cross-sectional detail of a typical ruled optical element, if this pattern were stamped into a sheet of plastic or other similar material, then the ruled side would be on one face of the sheet and the other side would be smooth (e.g., as in the bottom of the drawing). Substantially triangular profiles may be used as shown in FIG. 2, although other example embodiments may use these and/or other shapes. For instance, a holographic optical element could have a similar triangular profile, a profile that has rounded edges, etc.

Manufacturers have provided guidelines for selecting ruled versus holographic OEs. For example, Spectrum Scientific notes that:

"Ruled optical elements tend to generate more stray light than holographic optical elements. Although both were small, the stray light levels measured with the ruled optical elements were at least ten times as intense as that measured with Holographic optical elements. Claims by the manufacturers of HOEs indicate that stray light will increase for ROEs as groove density increases. HOEs do not exhibit this increase in stray light with groove density. Thus a holographic grating may be better suited for applications requiring low stray light and or dense groove spacing. ROEs are normally chosen when efficiency and overall throughput of the optical system are of primary concern. ROEs have a slight advantage in the efficiency of transmission light relative to HOEs. However, newer processes are improving the efficiency of holographic gratings. The choice of the type of OE that a manufacturer should use depends upon efficiency, stray light, and cost considerations. For a weak source the likely choice would be a ruled grating with a blaze near the wavelength of interest. HOEs might be preferred where a source of sufficient intensity is available and scattered light is undesirable. Finally, since the stray light increases with groove density for a ROE, but not for a HOE, for higher groove density gratings favor HOEs. Maximum groove density for ROEs is 3600 grooves/mm while 6000 grooves/mm groove densities have been produced holographically."

These and/or other similar factors may be taken into account when selecting an ROE or an HOE.

As will be appreciated from the above, then, one aspect of certain example embodiments relates to the addition of a beam steering element to a laminate including embedded LEDs for the purpose of redirecting light output from the LEDs, e.g., to compensate for the fact that the orientation of the LEDs within the glass laminate will not necessarily be aligned with the intended desires for and directions of the light output. For instance, the selection of a particular beam steering element may be specific to the orientation of the front or rear window angle with respect to some axis of orientation other than that of the glass surface itself.

In certain example embodiments, one or more of the same and/or different beam steering elements may be provided on one or both sides of the same sheet. In certain example embodiments, different sheets may be combined to provide similar arrangements. In certain example embodiments, a beam steering element may be provided on the same or opposite side as the beam steering elements. For instance, an optical element may include one or more beam steering elements that help to reduce the light falloff as a function of angle from some axis of orientation relative to the falloff without the beam steering element, while also having an index of refraction that is essentially higher than the refractive index of the adjacent adhesive layer and the glass layer. This may help to somewhat "focus" the output beam, relative to the LEDs' light output without the optical element.

Figure 3:
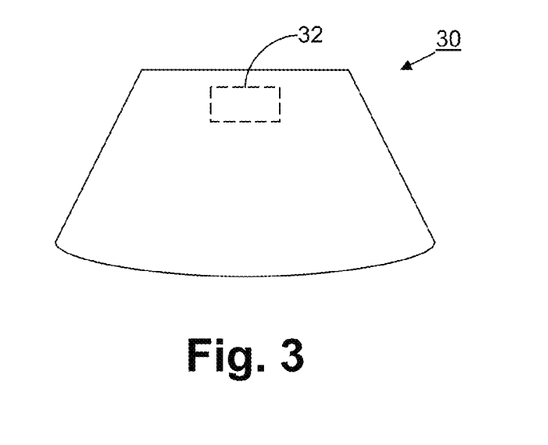
FIG. 3 is a top plan view of a window including a laminated LED array in accordance with certain example embodiments.
Figure 4:
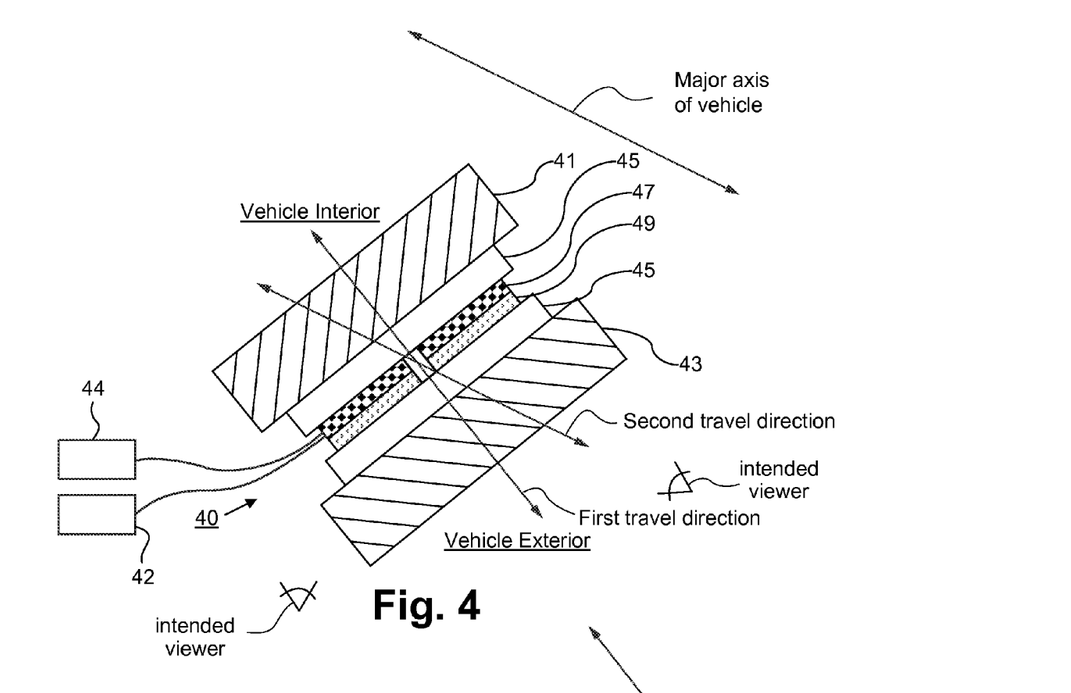
FIGS. 4-5 are cross-sectional views of windows including a laminated LED array in accordance with certain example embodiments.
Figure 5:
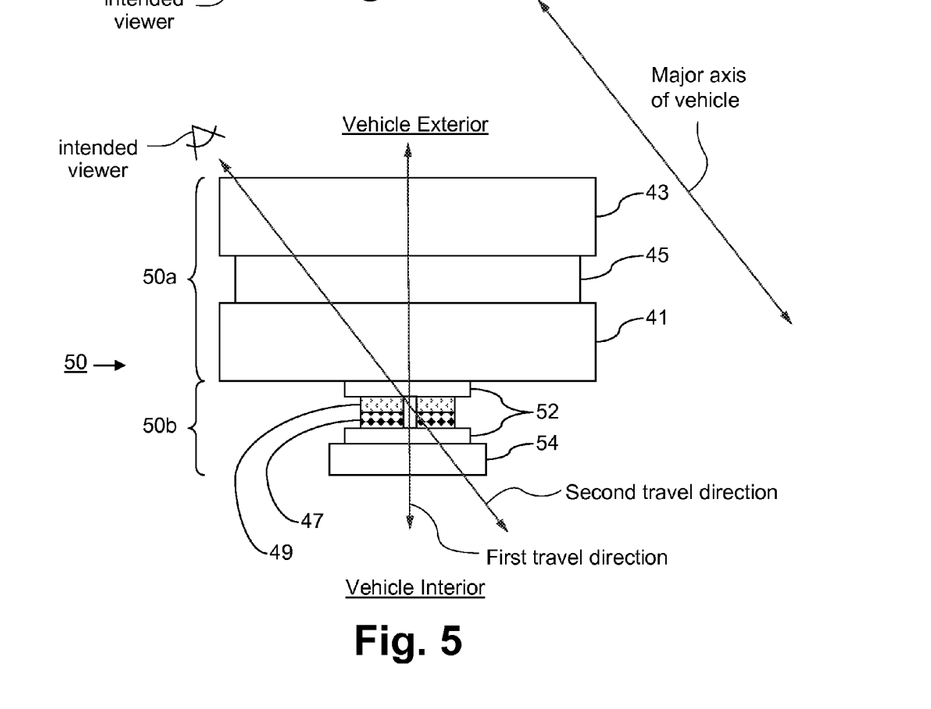

FIG. 3 is a top plan view of a window including a laminated LED array in accordance with certain example embodiments, and FIGS. 4-5 are cross-sectional views of windows including a laminated LED array in accordance with certain example embodiments. The window 30 is formed so as to have its desired shaped, which may be bent and/or angled. The outline 32 indicates one example, non-limiting position for the subassembly that corresponds to the CHMSL.

As shown in FIG. 4, the window 40 includes first and second substrates 41 and 43, which are laminated together using a suitable laminating material 45. This laminating material 45 may be of or include, for example, PVB, EVA, polyurethane, and/or any other suitable laminating material. Other suitable materials include transparent "glues" that can be injected or otherwise provided between the two substrates. In this sense, liquid-applied UV curable glues may be considered suitable laminating materials for these and/or other purposes described herein. The first and second substrates 41 and 43 typically are glass substrates and typically are 1-5 mm thick (and sometimes, for example, about 2 mm thick). The laminating material in essence may form layers surrounding/embedding the LEDs in the LED array. Such layers each may be, for example, 0.1-1.50 mm thick, more preferably 0.25-0.75 mm thick (and sometimes, for example, about 0.38 mm thick).

The array itself may be affixed to a conductive foil or flexible sheet 47 of or including PET, PMMA, polyimide, polyamide, and/or the like. The optical element 49 with the beam steering features therein may be interposed between the LED array and the viewer (which, in certain example embodiments, would be drivers and/or others generally behind the vehicle). It will be appreciated that this flexible sheet may be added at a desired location, potentially selected based on the desired use of the electronic device. For instance, when the LEDs are to be used in connection with a CHMSL, the subassembly will be provided in the approximate center and towards the upper portions of window 40.

In certain example embodiments, the conductive foil or flexible sheet 47 and optical element 49 may be laminated between two additional sheets, e.g., of or including glass. The additional substrates themselves may be laminated between the first and second substrates 41 and 43 in a desired location. This arrangement advantageously may provide additional protection for the subassembly and the electronic components therein. Leads may extend through the laminating material surrounding the conductive foil or flexible sheet 47 and optical element 49 and be in electrical contact with a power source. For instance, such leads may be in electrical contact with a low-emissivity coating provided on surface 2 or 3 of the window in order to convey data and/or power signals to the LEDs in the array. The data signals may address individual LEDs in the array to cause them to react in a prescribed manner (e.g., turn to a first predetermined color to indicate breaking, turn to a second different predetermined color to indicating backing up, flash to indicate a hazard, create a visual display, etc.). This arrangement may be a sort of "patch" that is inserted between the larger substrates 41 and 43 that principally form the window. Example techniques for suitable for connecting individual LEDs together and/or forming connections with the low-emissivity coating or other connection to a power source are disclosed in, for example, U.S. application Ser. No. 13/644,396, filed on Oct. 4, 2012, the entire contents of which are hereby incorporated by reference herein.

The area where the LED array is to be placed may in certain example embodiments be sized so that it fits within the curved and/or angled profile of the window. Smaller sizes may be allowed to bow during lamination in some example embodiments. For small patches in particular, it becomes possible to use a thick interlayer which may, in turn, help to reduce costs, lower overall weights, and provide for an ease of manufacturing that otherwise might not be possible. Cover plastic and/or heat deformable materials may be used in connection with certain example embodiments, e.g., to allow for bowing that matches or substantially matches the substrates where the LED array is to be embedded.

It will be appreciated that certain materials may be used to conceal portions of the glass patch. For example, a seal profile, housing, and/or framing may be provided for aesthetic reasons and may, for instance, be used to conceal wires, prevent light from shining in an unwanted area, etc. In a similar vein, opaque patterns may be applied in some cases, e.g., to hide busbars and/or to serve as current collectors, etc.

Referring now to FIG. 5, the assembly 50 includes two basic parts, namely a window assembly 50a and a patch 50b. The window assembly 50a includes first and second substantially parallel substrates 41 and 43 that are laminated together with a laminating material 45. The patch 50b, on the other hand, includes the conductive foil or flexible sheet 47 that supports the LEDs in the LED array, as well as the optical element 49 with the beam steering features that is interposed between the LED array and the viewer. A thin cover substrate 54 helps protect the flexible sheet 47 and the optical element 49. This sheet, which may be thinner than the substrates used in the window assembly 50a (preferably less than 3 mm thick, more preferably less than 2 mm thick, and sometimes about 1 mm thick), may be glass, plastic, or any other suitable material.

The flexible sheet 47 and the optical element 49 may be laminated to an inner surface of the first substrate 41 (which would correspond to interior of the vehicle's cabin) in certain example embodiments, and the laminating material 52 used to embed the LED array therein may be the same or different material than that used to laminate together the first and second substrates 41 and 43. In certain example embodiments, the thickness of the laminating material 45 may be thicker than the thickness of the laminating material 52. This may help to provide the structural integrity that is desirable for the window, while helping to make sure that the overall path 50 has a small thickness profile that is still adequate to protect the LED array and optical element 49 therein. Accordingly, in certain example embodiments, the layers 52 each may be 0.1-1.50 mm thick, more preferably 0.25-0.75 mm thick (and sometimes, for example, about 0.38 mm thick). By contrast, the laminating material 45 may be 0.25-2.00 mm thick, more preferably 0.50-1.00 mm thick (and sometimes, for example, about 0.76 mm thick).

In certain example embodiments, patches of the sort shown in FIG. 5 may be laminated on an already laminated transparency, allowing lower temperatures processes for the patch lamination. This may be advantageous in that it may help protect the LEDs.

It will be appreciated that the glass patches disclosed herein (e.g., in connection with FIG. 5) may be applied to single lite products (e.g., glass substrates that are not laminated to another substrate), to insulating glass (IG) units, vacuum insulating glass (VIG) units, etc. The substrate to which the patch is attached optionally may be heat strengthened, thermally tempered, or chemically strengthened. For instance, in connection with the second substrate 43 and the laminating material 45 may be omitted from the FIG. 5 example, and the patch 50b may be applied to a single heat treated or not heat treated substrate 41.

Figure 6:
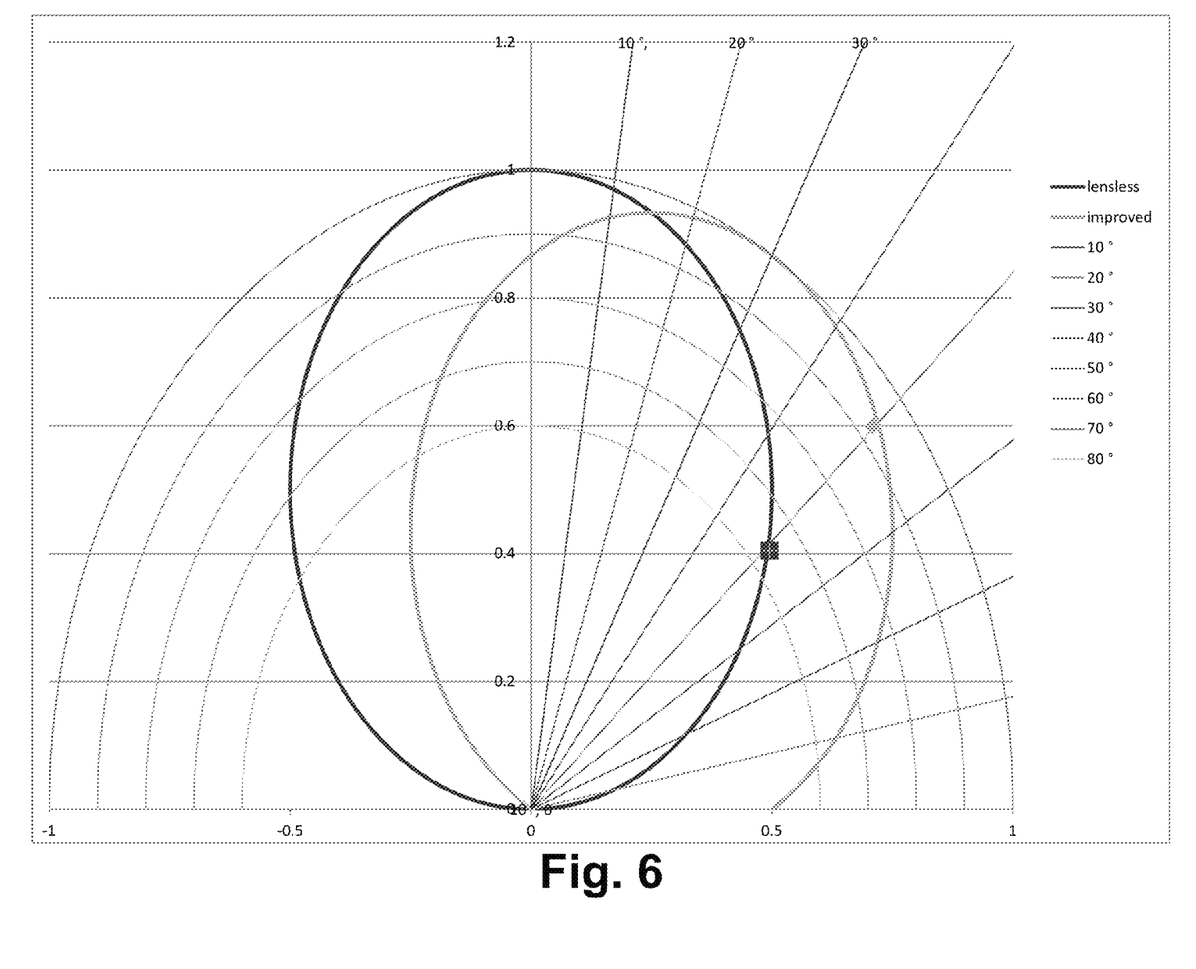
FIG. 6 is a graph showing the spatial light distribution of an embedded LED with and without the added light steering element of certain example embodiments.

FIG. 6 is a graph showing the spatial light distribution of an embedded LED with and without the added light steering element of certain example embodiments. The two points shown on the graph illustrate an example improvement of the proposed invention as follows. The lower square box represents the light output of an LED whose axis of orientation is aligned with that of the rear glass, and not in the direction of the driver immediately behind the vehicle. The light output of the LED in the direction of the driver is reduced about 10% for each concentric ring, starting from the outside ring, which is at about 35%. The upper diamond represents the light output of an LED whose axis of orientation is aligned with that of the rear glass in accordance with certain example embodiments. In this example, a holographic element that re-directs the LED light output by an angle of 30 degrees with respect to the axis of orientation of the rear glass and, thus, more in the direction of the driver immediately behind the vehicle. The light output of the LED in the direction of the driver is reduced by less than one ring, i.e. less than 10%. In this illustration, the light output in the direction of the driver due to this invention is improved by nearly 50% (93/64*100). This illustration is for a vehicle whose rear glass orientation with the vertical axis is at 50 degrees. The typical passenger car has an orientation of about 60 degrees (and oftentimes about 58 degrees), which would increase the improvement of this invention even more.

In view of the foregoing, it will be appreciated that in certain example embodiments, the light output drop-off relative to the maximum output in certain example embodiments preferably is less than 25%, more preferably less than 15%, and even more preferably less than 10%, at angles up to 50 degrees off of normal. It also will be appreciated that in certain example embodiments, the light output increase relative to a situation where no redirection is employed at angles between about 40-60 degrees from normal is preferably at least about 25%, more preferably at least about 40%, and sometimes around 50% or even higher. These gains should be possible with any suitably configured optical element.

Although certain example embodiments have been described as relating to certain displays or indicators for viewers outside of the vehicle, certain example embodiments may additionally or alternatively embed LEDs within a sandwich of glass and adhesive in a vehicle in order to serve as a signal or indicator for one or more persons inside the vehicle's cabin. For instance, certain example embodiments may additionally or alternatively signal the presence of that or another proximate vehicle, the intention of that vehicle (e.g., via break lights, left and right turn blinkers), etc. The location of the optical element may be adjusted or an additional optical element may be added (e.g., interposed between the LEDs and the viewers in the cabin) so that viewers in cabin can benefit from the beam redirection techniques disclosed herein. Because the primary viewer for some applications may be the driver, and because the driver's seat will be a generally fixed distance (that varies by the inclination/declination and/or forward/rearward placement of the car seat), the optical element can be potentially more carefully calibrated to focus for that particular viewer. In certain example embodiments, the same indications may be provided to both interior and exterior viewers, thereby potentially involving first and second optical elements differently tuned for the interior and exterior viewers. Two or more separate LED arrays may be provided in connection with this approach for the optional inward and outward lighting, and the arrays may be addressable separately or together in different example embodiments.

Certain example embodiments may incorporate thermal conductive material(s) adjacent to, or as a part of, an array of closely spaced cluster of LEDs. Doing so may help aid in the dissipation of excess heat generated in the operation of the LEDs, thereby helping the LEDs to operate at an improved efficiency and potentially increasing their lifetimes. For instance, an optical out-coupling layer stack (OCLS) system may be provided in certain example embodiments, with the OCLS system helping to serve as a heat sink while also optionally providing index matching and/or éendue conserving purposes. See, for example, U.S. Publication No. 2012/0088319, as well as U.S. application Ser. No. 13/488,779, filed on Jun. 5, 2012, the entire contents of each of which are hereby incorporated herein by reference.

Certain example embodiments have been described in relation to vehicle windows and/or lighting products. However, the techniques described herein may be used in connection with other applications such as, for example, commercial or residential windows, vehicle windows (e.g., windshields, backlites, skylights, sidelites, etc.), display products (e.g., for backlights in LCD and/or other flat panel designs), mobile devices, decorative elements (e.g., windows, doors, skylights, sidelights, etc.), etc. Imaging and/or non-imaging devices may take advantage of the example techniques disclosed herein. For example, a logo, symbol, or other image may be illuminated using the techniques disclosed herein, as may a more detailed passive or active matrix LED device. In the case of signage, for example, the example techniques disclosed herein may be used and circuitry may be programmable, e.g., in connection with a train, bus, or other destination sign; road signs concerning potential alerts; etc.; in order to individually turn on and off the LEDs or groups of LEDs to create a desired display (e.g., of custom messages, symbols, images, and/or the like). In a similar vein, and as alluded to above, certain example embodiments may incorporate different colors of LEDs embedded within the laminate structure, either to be turned on simultaneously or sequentially, e.g., for use in displays, logo illumination, to replace conventional tri-color LEDs, etc.

Any suitable LEDs may be used in connection with different embodiments. For example, bare die LEDs may be used, as may LEDs disposed on printed circuit boards. The use of LEDs whose thickness is less than 1 mm, more preferably less than 0.5 mm, may be particularly advantageous, as the distortion of the adhesive around the edges of the LED or LEDs will be reduced compared to larger thicknesses. In addition, it will be appreciated that certain example embodiments may make use of inorganic LEDs, organic LEDs, etc. Certain example embodiments may incorporate LEDs that have different operating voltages. In such cases, compensating circuit layouts or designs may be provided within, or in communication with, the embedded LED structure.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments.

In certain example embodiments, a window for a vehicle is provided. First and second glass substrates are laminated to one another via a first laminating material. A sheet supports a plurality of LEDs. An optical element is interposed between the LEDs and an intended viewer of the LEDs. The optical element is structured to redirect light output from the LEDs in a direction that is substantially in alignment with a major axis of the vehicle.

In addition to the features of the previous paragraph, in certain example embodiments, the LEDs and the optical element may be disposed between the first and second glass substrates.

In addition to the features of either of the two previous paragraphs, in certain example embodiments, a cover substrate may be provided. The optical element and the LEDs may be disposed between the cover substrate and the first substrate, and the optical element and the LEDs may be laminated to the cover substrate and the first substrate via a second laminating material.

In addition to the features of the previous paragraph, in certain example embodiments, the first substrate may be adapted to be adjacent to an interior of the vehicle.

In addition to the features of either of the two previous paragraphs, in certain example embodiments, the cover substrate may be made of glass and may be thinner than the first and second substrates.

In addition to the features of any of the three previous paragraphs, in certain example embodiments, the first and second laminating materials may have the same composition.

In addition to the features of any of the four previous paragraphs, in certain example embodiments, the first laminating material may be provided at a thickness greater than a thickness of the second laminating material In addition to the features of any of the seven previous paragraphs, in certain example embodiments, the plurality of LEDs may be provided as a part of a Center High Mounted Stop Lamp (CHMSL), the CHMSL optionally being controllable by a controller remote from the LEDs.

In addition to the features of any of the eight previous paragraphs, in certain example embodiments, the first laminating material may comprise PVB, EVA, PU, a glue material (such as a liquid-applied UV curable glue material), or the like.

In addition to the features of any of the nine previous paragraphs, in certain example embodiments, the first and second substrates may be curved and may be adapted to be installed in the vehicle such that the window as a whole is disposed at an angle that is not perpendicular to the major axis of the vehicle.

In addition to the features of any of the ten previous paragraphs, in certain example embodiments, the optical element may include a plurality of beam steering elements, the beam steering elements optionally being configured to redirect light output from the LEDs in at least two different directions.

In addition to the features of any of the 11 previous paragraphs, in certain example embodiments, the optical element may be a holographic optical element having a groove density and a blaze angle selected to ensure that a substantial portion of light output from the LEDs is directed or redirected towards the intended viewer. Alternatively, in addition to the features of any of the 11 previous paragraphs, in certain example embodiments, the optical element may be a ruled optical element having a groove density and a blaze angle selected to ensure that a substantial portion of light output from the LEDs is directed or redirected towards the intended viewer.

In certain example embodiments, an electronic device is provided. First and second glass substrates are laminated to one another via a first laminating material, with the first and second substrates having substantially matching curvatures and/or being adapted for installation at an angle that is not normal to a first intended viewer's line of sight. A sheet supports a first set of LEDs. A first holographic or ruled optical element is interposed between the first set of LEDs and the first intended viewer of the first set of LEDs, with the first optical element being structured to redirect at least some light output from the first set of LEDs such that a substantial amount of light output from the first set of LEDs is focused in a first direction that is generally normal to the first intended viewer's line of sight. The first set of LEDs and the first optical element are (a) disposed between the first and second glass substrates, and/or (b) laminated between a cover glass substrate and the first substrate with a second laminating material.

In addition to the features of the previous paragraph, in certain example embodiments, control circuitry 44 may be provided and configured to individually address and power the first set of LEDs.

In addition to the features of either of the two previous paragraphs, in certain example embodiments, a second set of LEDs and a second holographic or ruled optical element may be provided. The second optical element may be interposed between the second set of LEDs and a second intended viewer, with the second optical element optionally being structured to redirect at least some light output from the second set of LEDs such that a substantial amount of light output from the second set of LEDs is focused in a second direction, different from the first direction, that is generally normal to the second intended viewer's line of sight.

In certain example embodiments, a sign or display may include, for example, the device of any of the previous three paragraphs.

In certain example embodiments, a method of making a window for a vehicle is provided. First and second glass substrates are laminated together with a first laminating material. A sheet supporting a plurality of LEDs and an optical element to be oriented between the LEDs and an intended viewer of the LEDs are provided. The optical element is structured to redirect light output from the LEDs in a direction that is substantially in alignment with a major axis of the vehicle. The LEDs and the optical element are laminated (a) between the first and second glass substrates, and/or (b) between a cover substrate and the first substrate in connection with a second laminating material.

In addition to the features of the previous paragraph, in certain example embodiments, the first substrate may be adapted to be adjacent to an interior of the vehicle.

In addition to the features of either of the two previous paragraphs, in certain example embodiments, the cover substrate may be made of glass and may be thinner than the first and second substrates.

In addition to the features of any of the three previous paragraphs, in certain example embodiments, the first laminating material may comprise PVB, EVA, PU, a glue, or the like.

In addition to the features of any of the four previous paragraphs, in certain example embodiments, the LEDs and the optical element may be laminated between the cover substrate and the first substrate; the first and second laminating materials may be the same; and the first laminating material may be provided at a thickness greater than a thickness of the second laminating material.

In addition to the features of any of the five previous paragraphs, in certain example embodiments, the plurality of LED may be provided as a part of a Center High Mounted Stop Lamp (CHMSL), the CHMSL optionally being controllable by a controller 42 remote from the LEDs.

In addition to the features of any of the six previous paragraphs, in certain example embodiments, the first and second substrates may be curved and may be adapted to be installed in the vehicle such that the window as a whole is disposed at an angle that is not perpendicular to the major axis of the vehicle.

In addition to the features of any of the seven previous paragraphs, in certain example embodiments, the optical element may include a plurality of beam steering elements, with the beam steering elements being configured to redirect light output from the LEDs in at least two different directions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An electronic device for a window of a vehicle, comprising:
   first and second glass substrates laminated to one another via a first laminating material forming a vehicle window, the first and second substrates having substantially matching curvatures and being adapted for installation in the vehicle at an angle that is not normal to a first intended viewer's line of sight;
   a sheet supporting a first set of LEDs; and
   a first holographic optical element configured to be interposed between the first set of LEDs and a first intended viewer of the first set of LEDs,
   wherein the first set of LEDs and the first optical element are laminated between a cover glass substrate and the first substrate with a second laminating material, wherein the first glass substrate is located between the second glass substrate and the cover glass substrates, and wherein the cover glass substrate is smaller in size than are the first and second glass substrates; and wherein
   the first holographic optical element includes a plurality of optical elements, the optical elements being configured to redirect light output from the LEDs in at least two different directions, so that light emitted from the first set of LEDs is substantially directed in a direction away from a front-to-rear axis of the vehicle, but is redirected by the first holographic optical element so as to be directed substantially parallel to the front-to-rear axis of the vehicle and toward another driver;
   wherein the cover glass substrate is thinner than each of the first and second glass substrates; and
   wherein the first holographic element is located directly between (a) a laminating material that laminates the first holographic element to the cover glass substrate, and (b) the laminating sheet supporting the first set of LEDs.

2. The device of claim 1, further comprising control circuitry configured to individually address and power the first set of LEDs.

3. The device of claim 1, further comprising a second set of LEDs and a second holographic optical element,
   wherein the second optical element is interposed between the second set of LEDs and a second intended viewer, wherein the travel direction of at least some light output from the second set of LEDs and having been transmitted through the second optical element is along a second travel direction, different from the first travel direction, that is generally normal to the second intended viewer's line of sight.

4. The device of claim 1, wherein
   the first substrate is adapted to be adjacent to an interior of the vehicle.

5. The device of claim 1, wherein
   the first laminating material comprises PVB, EVA, or PU.

6. The device of claim 1, wherein the plurality of LEDs are provided as a part of a Center High Mounted Stop Lamp (CHMSL), the CHMSL being controllable by a controller remote from the LEDs.

* * * * *